(12) United States Patent
Nakamura et al.

(10) Patent No.: US 11,536,814 B2
(45) Date of Patent: Dec. 27, 2022

(54) DISTANCE MEASURING APPARATUS HAVING DISTANCE CORRECTION FUNCTION

(71) Applicant: FANUC CORPORATION, Yamanashi (JP)

(72) Inventors: Minoru Nakamura, Yamanashi (JP); Yuuki Takahashi, Yamanashi (JP); Atsushi Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 890 days.

(21) Appl. No.: 16/412,431

(22) Filed: May 15, 2019

(65) Prior Publication Data

US 2020/0018836 A1    Jan. 16, 2020

(30) Foreign Application Priority Data

Jul. 12, 2018  (JP) .............................. JP2018-132583

(51) Int. Cl.
| | | |
|---|---|---|
| *G01S 17/08* | (2006.01) | |
| *G01S 5/00* | (2006.01) | |
| *G01S 17/06* | (2006.01) | |
| *G01S 7/497* | (2006.01) | |
| *G01S 7/4915* | (2020.01) | |
| *G01S 17/89* | (2020.01) | |
| *G01S 17/32* | (2020.01) | |
| *G01S 17/10* | (2020.01) | |

(52) U.S. Cl.
CPC ............ *G01S 7/497* (2013.01); *G01S 7/4915* (2013.01); *G01S 17/08* (2013.01); *G01S 17/89* (2013.01)

(58) Field of Classification Search
USPC ..... 356/3, 3.01, 3.02, 3.03, 3.04, 3.05, 3.11, 356/3.12; 348/140, 61
See application file for complete search history.

(56) References Cited

U.S. PATENT DOCUMENTS

| | | | |
|---|---|---|---|
| 2002/0067474 A1* | 6/2002 | Uomori ................. | G01S 7/4911 356/3.01 |
| 2014/0362184 A1 | 12/2014 | Jovanovski et al. | |
| 2015/0279016 A1 | 10/2015 | Kim et al. | |
| 2016/0123764 A1 | 5/2016 | Lee et al. | |
| 2018/0131922 A1* | 5/2018 | Nakamura ............ | G01S 7/4816 |
| 2020/0033475 A1* | 1/2020 | Nakamura ............ | G01S 7/4913 |

FOREIGN PATENT DOCUMENTS

| | | |
|---|---|---|
| JP | H8-219775 A | 8/1996 |
| JP | 2010117211 A | 5/2010 |
| JP | 2010-151682 A | 7/2010 |
| JP | 2010151680 A | 7/2010 |

(Continued)

*Primary Examiner* — Daquan Zhao
(74) *Attorney, Agent, or Firm* — Hauptman Ham, LLP

(57) ABSTRACT

A distance measuring apparatus includes a reference object distance calculation section which calculates a distance to a reference object based on a two-dimensional image in which the reference object, which includes a plurality of feature points having obvious three-dimensional coordinate correlations, is captured, and a correction amount calculation section which calculates a correction amount for correcting a distance image by comparing the calculated distance to the reference object with a distance measurement value to the reference object in the distance image.

5 Claims, 6 Drawing Sheets

(56) References Cited

FOREIGN PATENT DOCUMENTS

| | | | |
|---|---|---|---|
| JP | 2013-200186 | A | 10/2013 |
| JP | 2013207415 | A | 10/2013 |
| JP | 2014-70936 | A | 4/2014 |
| JP | 2015-56057 | A | 3/2015 |
| JP | 2015-175752 | A | 10/2015 |
| JP | 2018-25474 | A | 2/2018 |
| WO | 2017122529 | A1 | 7/2017 |

* cited by examiner

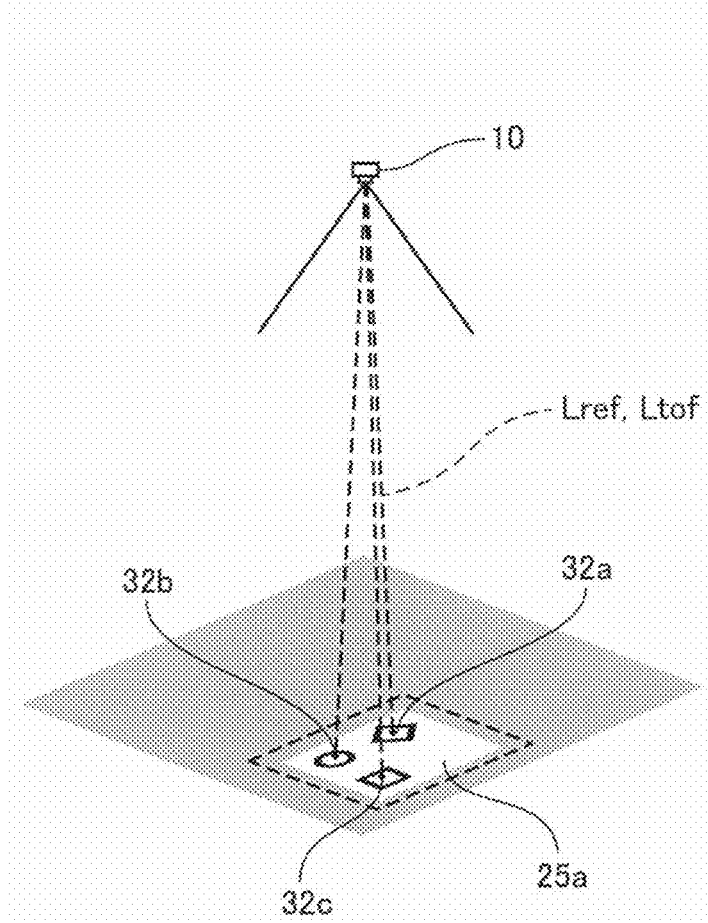

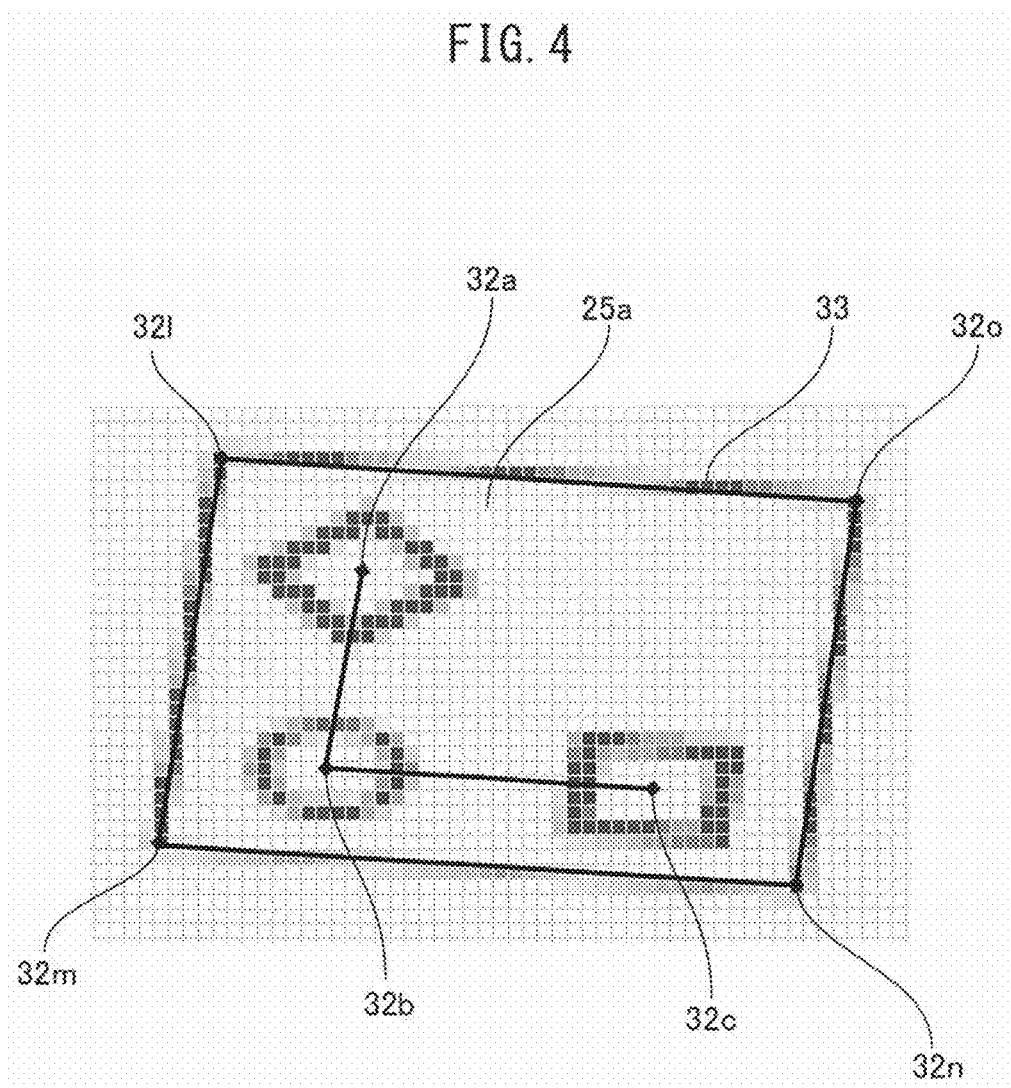

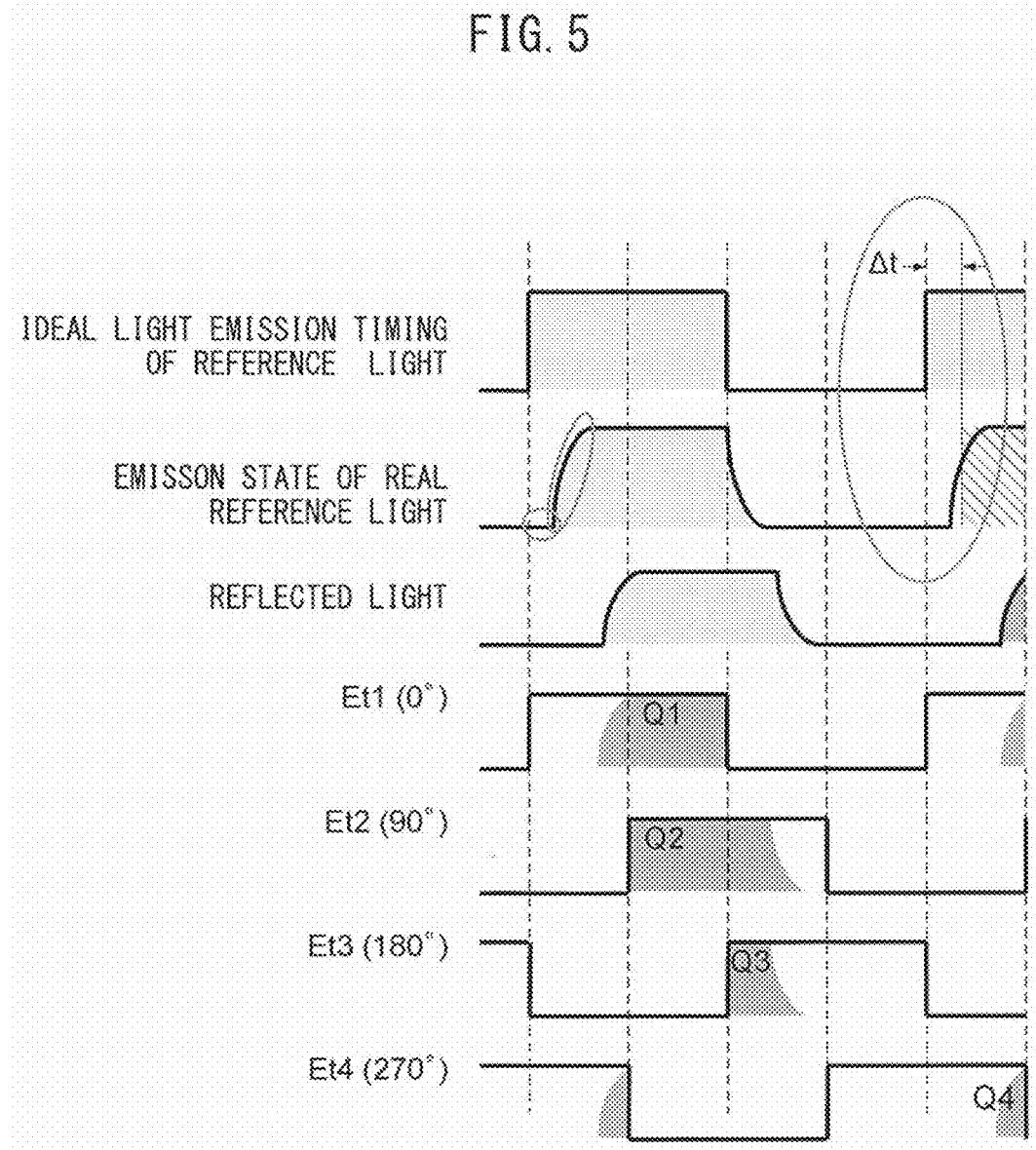

DISTANCE MEASURING APPARATUS HAVING DISTANCE CORRECTION FUNCTION

RELATED APPLICATIONS

The present application claims priority of Japanese Application Number 2018-132583, filed Jul. 12, 2018, the disclosure of which is hereby incorporated by reference herein in its entirety.

BACKGROUND OF THE INVENTION

1. Field of the Invention

The present invention relates to a distance measuring apparatus which measures a distance to an object based on a time of flight of light, and in particular, relates to a distance measuring apparatus having a distance correction function.

2. Description of the Related Art

TOF (time of flight) cameras which output a distance based on the time of flight of light are known as a distance measuring apparatus for measuring the distance to the object. Many TOF cameras use a phase difference method in which measurement light with an intensity modulated over predetermined cycles is irradiated a target measurement space, and a phase difference between the irradiated measurement light and the light reflected by the object in the target measurement space is detected.

TOF cameras, which are three-dimensional sensors, cause distance measurement errors due to individual characteristic variations in electronic elements thereof (e.g., light receiving elements, A/D conversion element, etc.), aging of the electronic elements, etc. Regarding individual characteristic variations, though a camera supplier adjusts the variations within target error ranges by calibration performed under specific conditions at the time of shipment, distance measurement errors may increase depending on differences in usage environment (in particular temperature), aging, etc. These distance measurement errors differ individually.

Japanese Unexamined Patent Publication (Kokai) No. 2015-175752 discloses a distance image generation device which uses a light-time-of-flight-type distance image sensor. The distance image generation device performs distance image smoothing by determining filter parameters (size, coefficient, frame number, etc.) used for smoothing for objects of a known size.

Japanese Unexamined Patent Publication (Kokai) No. 2015-056057 discloses a method for estimating the posture of a marker using a TOF camera. In this posture estimation method, the marker is detected from a camera image, the marker area is extracted from a distance image, an optimal plane is estimated from the extracted distance image, and the position and posture of the marker are estimated from the estimated plane.

Japanese Unexamined Patent Publication (Kokai) No. 2014-070936 discloses an erroneous pixel detection device for detecting erroneous pixels of a TOF camera. The erroneous pixel detection device compares a distance correction TOF image, which is a TOF image (bright image) which has been corrected based on a distance image, with a captured image acquired from an imaging camera, and detects erroneous pixels having measurement errors in the distance image based on the comparison results.

SUMMARY OF THE INVENTION

Actual reference light produces timing delays and waveform blunting relative to ideal light emission timing of the reference light due to individual characteristics of the electronic elements of TOF cameras, in particular, semiconductor laser (LD), transistors, resistors, etc. (refer to FIG. 5). Such timing delays and waveform blunting are not random, but rather are repetitive, and since such timing delays and waveform blunting can be regarded as a simple delay or an average delay for ideal emission pulses, such timing delays and waveform blunting are equivalent to a state in which an offset $\Delta t$ with respect to a phase of the reflected light has been added to distance measurement values, and correction of the offset relative to the distance measurement values can be considered necessary. Thus, the supplier of the TOF camera acquires, as a parameter at the time of calibration prior to shipment, an offset $\Delta L$ of the distance measurement values caused by the offset $\Delta t$, which is an individual difference for each TOF camera, from the results of distance measurement of an object at a specified distance, and thereafter the TOF camera outputs the distance measurement values which were corrected based on the offset $\Delta L$.

However, during actual use of the TOF camera, the timing delay and waveform blunting (i.e., simple delay) corresponding to the offset $\Delta t$ fluctuate due to ambient temperature, changes in temperature depending on heat generation of components, etc., time-dependent change of the individual characteristics, etc., whereby the distance measurement values may also change. Specifically, the distance measurement value of each pixel in TOF camera will vary. Though attempts have been made to mount a temperature sensor inside the TOF camera to detect such fluctuations and to change a correction amount in accordance with the detected temperature, such a solution does not fully solve problems due to issues relating to the position and accuracy of the temperature sensor.

Thus, there is a need for a distance measuring apparatus that easily enables accurate distance correction.

An aspect of the present disclosure provides a distance measuring apparatus, including a light emitting section which emits reference light to a target measurement space at a predetermined light emission timing, and a plurality of light receiving elements which are two-dimensionally arranged and which receive incident light from the target measurement space at a predetermined image capture timing, wherein the distance measuring apparatus outputs a distance image to an object in the target measurement space based on light reception amounts of the light receiving elements and a two-dimensional image corresponding to the distance image, the distance measuring apparatus further including a reference object distance calculation section which calculates a distance to the reference object based on the two-dimensional image in which a reference object including a plurality of feature points having obvious three-dimensional coordinate correlations is captured, and a correction amount calculation section which calculates a correction amount for correcting the distance image by comparing the calculated distance to the reference object with a distance measurement value to the reference object in the distance image.

BRIEF DESCRIPTION OF THE DRAWINGS

FIG. 2A is an explanatory diagram showing a distance correction method according to one embodiment in which a reference marker is used as a reference object.

FIG. 4 is an explanatory diagram showing a distance correction method according to other embodiment.

FIG. 5 is a view showing the light emission timing delay and waveform blunting of reference light according to prior art.

DESCRIPTION OF PREFERRED EMBODIMENTS

Figure 1:
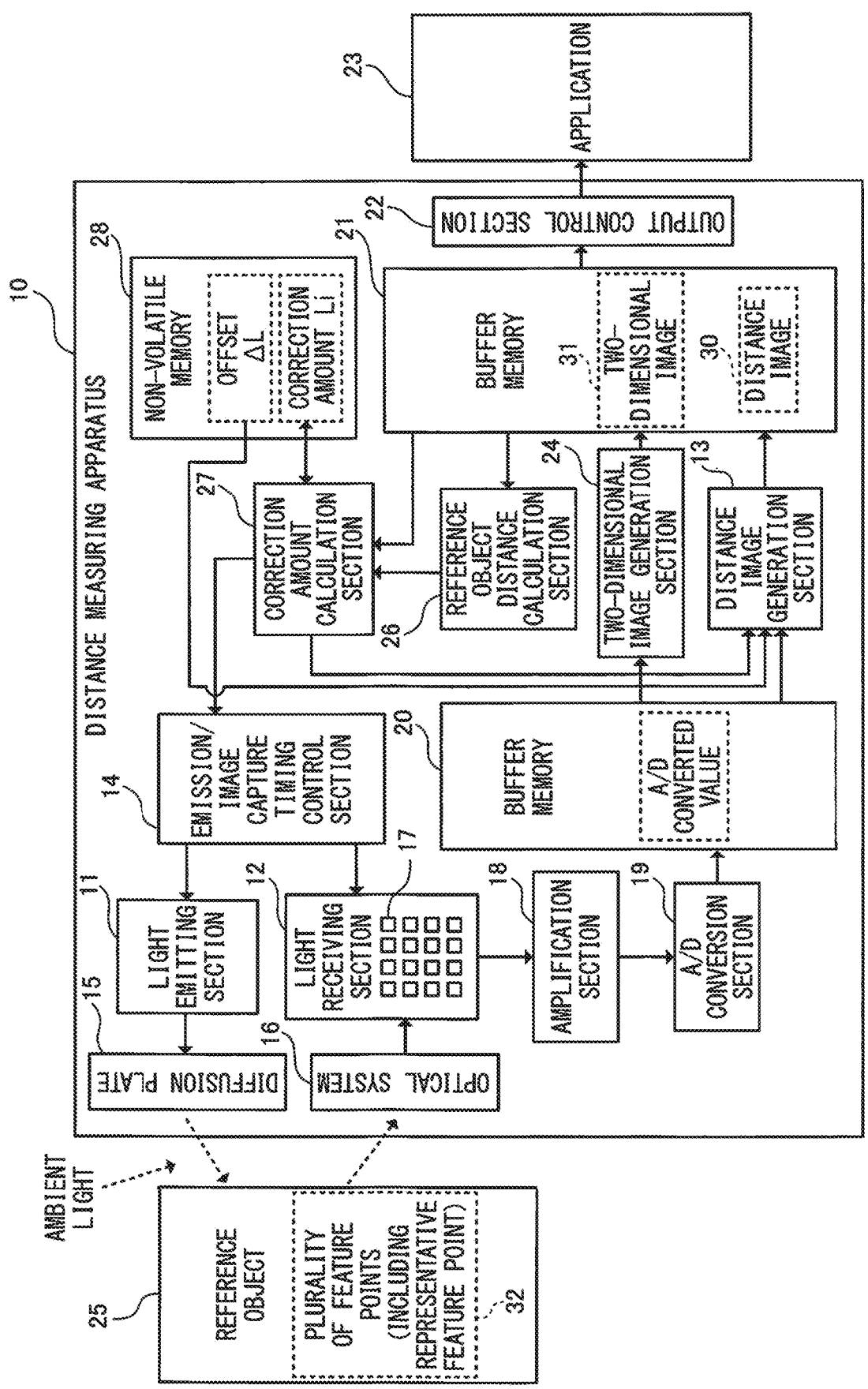
FIG. 1 is a block diagram of a distance measuring apparatus according to one embodiment.

The embodiments of the present disclosure will be described in detail below with reference to the attached drawings. In the drawings, identical or similar constituent elements have been assigned the same or similar reference numerals. Furthermore, the embodiments described below do not limit the technical scope of the inventions described in the claims or the definitions of terms.

FIG. 1 is a block diagram of a distance measuring apparatus 10 according to the present embodiment. The distance measuring apparatus 10 is a TOF camera which measures a distance to an object based on, for example, a phase difference method. The distance measuring apparatus 10 comprises a light emitting section 11 which emits reference light L1 emitted to a target measurement space, a light receiving section 12 which receives incident light L2 from the target measurement space, and a distance image generation section 13 which generates a distance image to the object in the target measurement space.

The light emitting section 11 is constituted by a light source such as a light-emitting diode (LED) or LD which emits, for example, near-infrared (NIR) light, and emits reference light L1 which is intensity modulated on a predetermined cycle based on a light emission timing signal from an emission/image capture timing control section 14. The reference light L1 is diffused by a diffusion plate 15 and emitted to the target measurement space.

The light receiving section 12 is constituted by an image sensor such as a CCD or CMOS including, for example, an RGB filter, NIR filter, etc., and receives incident light L2 via an optical system 16 including a collecting lens or the like. The incident light L2 includes ambient light in addition to the reference light reflected by the object. The light receiving section 12 includes four light receiving elements in which each pixel receives red light, blue light, green light, and NIR light. Alternatively, the light receiving section 12 may comprise a single light receiving element in which each pixel receives only NIR light.

The light receiving element 17 is constituted by, for example, a photodiode or capacitor. A light receiving element 17 which receives NIR light receives light at a plurality of image capture timings which are delayed by a predetermined phase with respect to the light emission timing of the reference light L1 based on an image capture timing signal from the emission/image capture timing control section 14. For example, light reception amounts $Q_1$ to $Q_4$ are acquired at image capture timings Et1 to Et4, which are out of phase by 0°, 90°, 180°, and 270°, respectively, with respect to the ideal light emission timing of the reference light. A light receiving element 17 which receives red light, blue light, and green light acquires the light reception amounts over a predetermined imaging period. As shown in FIG. 1, the acquired light reception amounts are amplified by an amplification section 18, A/D converted by an A/D conversion section 19, and the A/D converted values are stored in a buffer memory 20.

The distance image generation section 13 generates a distance image 30 to the object in the target measurement space based on the A/D converted values of the light reception amounts $Q_1$ to $Q_4$ of the NIR light. The distance measurement value $L_{tof}$ is calculated from, for example, the known formula described below. Td is a phase difference between the reference light and the reflected light, c is a speed of light, and f is a frequency. The generated distance image is stored in a buffer memory 21, and is output to an application 23 via an output control section 22.

$$Td = \arctan\left(\frac{Q_2 - Q_4}{Q_4 - Q_3}\right) \quad \text{[Formula 1]}$$

$$L_{tof} = \frac{c}{4\pi f} Td \quad \text{[Formula 2]}$$

A two-dimensional image generation section 24 generates a two-dimensional image 31 based on the A/D converted values of the light reception amounts of the RGB light or the NIR light. In other words, the two-dimensional image 31 may be an RGB image (color image), or may be an NIR image (monochrome image). The two-dimensional image 31 is stored in the buffer memory 21, and is output to the application 23 via the output control section 22.

As described above with reference to FIG. 5, the actual light emission timing of the reference light includes an offset Δt relative to the ideal light emission timing of the reference light, an offset ΔL of the distance measurement values caused by the offset Δt is acquired during calibration at the time of shipment. The distance measurement values which were corrected based on the offset ΔL are output inside the TOF camera. Thus, the distance measurement value $L_{tof}$ can be calculated from the formula described below, in which the correction of the offset ΔL has been added.

$$L_{tof} = \frac{c}{4\pi f} Td + \Delta L \quad \text{[Formula 3]}$$

Since the offset Δt changes in accordance with changes in temperature, aging, etc., there is a possibility that the final distance image may also include distance measurement errors. In order to correct such fluctuations of the offset Δt (and to correct the distance image), the distance measuring apparatus 10 of the present embodiment has a distance correction function. The distance measuring apparatus 10 uses the distance to a reference object 25 (refer to FIG. 1) which was geometrically calculated from the two-dimensional image 31 to calculate a correction amount Li for correcting the distance image 30. In order to geometrically calculate the distance to the reference object 25, it is necessary to include a plurality of feature points 32 having obvious three-dimensional coordinate correlations on the reference object 25. Note that "obvious three-dimensional coordinate correlations" means that the relative positional relationships thereof can be known. In other words, it is not always necessary that the correlations of three-dimensional coordinates be known (specifically, it is not necessary that they be stored in advance in a memory or the like of the distance measuring apparatus 10).

FIG. 2A is an explanatory diagram showing a distance correction method in which a reference marker 25a is used as the reference object 25. As shown in FIG. 4, the reference marker 25a is a square, white, plate-like member having a known size on which a perfect circle, a square, and a rhombus having known sizes and positional relationships are arranged, and includes a large number of feature points having known three-dimensional coordinate correlations. For example, the feature points may be central portions of the perfect circle, square, and rhombus (indicated as 32a, 32b, and 32c, respectively). Further, the center of the perfect circle of the reference marker 25a is a representative feature point 32b. The distance measuring apparatus 10 detects the reference marker 25a from a two-dimensional image in which the reference marker 25a is captured using known image processing, and specifies the position coordinates of the various feature points of the reference marker 25a in the image at the sub-pixel level.

The distance measuring apparatus 10 geometrically calculates the distance $L_{ref}$ to the representative feature point 32b from the combination of the position coordinates of the plurality of feature points (generally, four or more) in the image. In order to calculate the distance $L_{ref}$ more accurately, a plurality of values of $L_{ref}$ may be calculated from different combinations of the plurality of feature points, and the average thereof may be used. The distance measuring apparatus 10 calculates the correction amount Li for correcting the distance image by comparing the distance $L_{ref}$ to the representative feature point 32b calculated based on the two-dimensional image with the distance measurement value $L_{tof}$ of the representative feature point 32b in the distance image. In such a distance correction method, the two-dimensional image and the distance image correspond to each other on a pixel-by-pixel basis, and accordingly, it is not necessary to perform a process in which the feature points of the two images are matched or merged as in a known stereo method, and further, when the positional coordinates of the representative feature point 32b in the image are specified on a sub-pixel level, since the distance measurement value of the representative feature point in the distance image can also be calculated with high precision by interpolation with distance measurement values of the surrounding pixels, an accurate correction amount Li can be calculated. Furthermore, by preparing the reference marker in advance, a user can easily perform correction when correction is desired. Alternatively, the distance measuring apparatus 10 may continuously image the reference marker 25a and change the correction amount at any time in order to maintain accuracy.

Figure 2B:
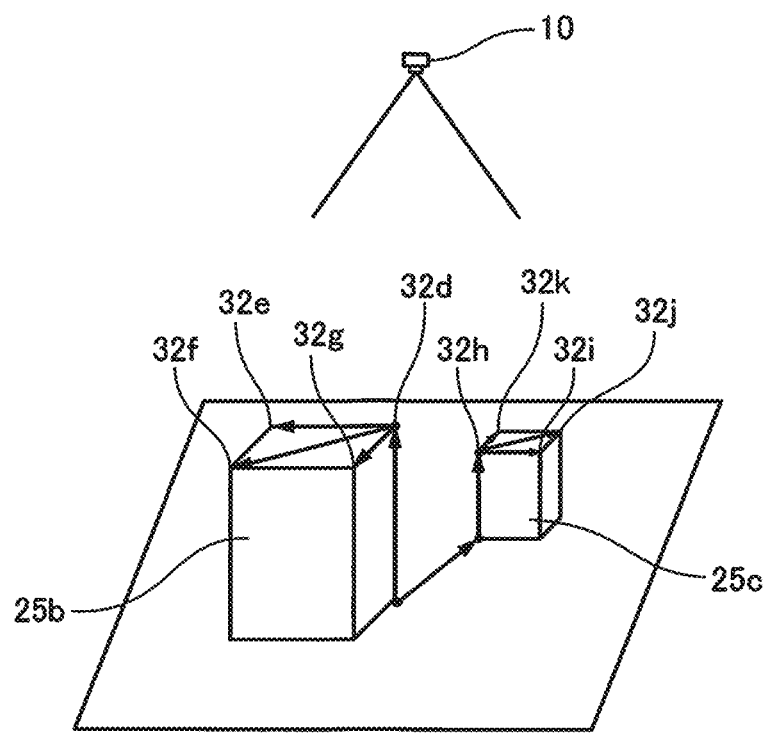
FIG. 2B is an explanatory diagram showing a distance correction method according to one embodiment in which an arbitrary object is used as the reference object.

FIG. 2B is an explanatory diagram showing the distance correction method in which arbitrary objects 25b, 25c are used as reference objects. In the present example, the correlations of the three-dimensional coordinates of ten feature points of the two rectangular parallelepipeds 25b, 25c are represented by nine vectors. For example, an operator may directly input the three-dimensional coordinates of the nine vectors to the distance measuring apparatus 10 or may indicate the positions of the eight corners 32d, 32e, 32f, 32g, 32h, 32i, 32j, 32k of the two rectangular parallelepipeds in the two-dimensional image captured by the distance measuring apparatus 10 and input the lengths of the sides of the two rectangular parallelepipeds and the distance between the two rectangular parallelepipeds. As may be understood from the foregoing, the distance measuring apparatus 10 preferably comprises a means for indicating, as the correlation of the three-dimensional coordinates, feature values of the object (e.g., three-dimensional coordinates of the vectors, positions of the feature points of the object, size of the object itself, specific shape, pattern, color, etc., of the object) or the positional relationship of a plurality of objects (e.g., distance between objects). As a result, the arbitrary objects 25b, 25c serve as the reference marker 25a.

Referring again to FIG. 1, the distance measuring apparatus 10 of the present embodiment comprises a reference object distance calculation section 26 which calculates a distance to the reference object 25, and a correction amount calculation section 27 which uses the distance to the reference object 25 to calculate the correction amount Li for correcting the distance image 30. The reference object distance calculation section 26 and the correction amount calculation section 27 can be realized as software which causes a processor such as a central processing unit (CPU) to function. Alternatively, for example, the processing of at least some of such software may be executed as hardware such as an executable processor.

The reference object distance calculation section 26 retrieves the two-dimensional image 31, in which the reference object 25 comprising a plurality of feature points 32 (including the representative feature point 32b) having known three-dimensional coordinate correlations is captured, from the buffer memory 21, and geometrically calculates the distances to the feature points 32 based on the two-dimensional image 31.

The correction amount calculation section 27 calculates the correction amount for correcting the distance image by comparing the distance $L_{ref}$ to the representative feature point 32b calculated by the reference object distance calculation section 26 with the distance measurement value $L_{tof}$ of the representative feature point 32b in the distance image 30 stored in the buffer memory 21. For example, the correction amount Li may be a value calculated as the difference between the distance $L_{ref}$ and the distance measurement value $L_{tof}$ as shown in the formula below, or may be calculated from a plurality of coefficient value groups in a functional expression obtained by separate verification testing for performing more advanced correction with respect to the various distance measurement values of all of the pixels.

$$Li=L_{tof}-L_{ref} \qquad \text{[Formula 4]}$$

The correction amount calculation section 27 stores the correction amount Li in a non-volatile memory 28, and retrieves and reuses the correction amount Li from the non-volatile memory 28 when the distance measuring apparatus 10 is powered on. Alternatively, in applications in which the distance measuring apparatus 10 continuously images the reference marker 25a, the correction amount Li may be changed as needed to maintain accuracy. Furthermore, the correction amount calculation section 27 outputs the correction amount Li to the emission/image capture timing control section 14 or the distance image generation section 13.

The emission/image capture timing control section 14 controls the light emission timing or image capture timing based on the correction amount Li. For example, when the correction amount Li is a distance correction value as in the formula described above, the emission/image capture timing control section 14 calculates an offset Δt' which is corrected based on the formula described below, and shifts the image capture timing or light emission timing so as to delay the image capture timing relative to the light emission timing by only the offset Δt'. The reason that the calculation is multiplied by two is because the reflected light travels twice the distance of the distance measurement value.

$$\Delta t' = 2 \times \frac{Li}{c} \qquad \text{[Formula 5]}$$

Alternatively, the distance image generation section 13 may correct the distance image based on the correction amount Li. For example, when the correction amount Li from the correction amount calculation section 27 is valid, in addition to correcting the offset ΔL, the distance image generation section 13 corrects the distance measurement value $L_{tof}$ by superimposing the correction amount Li as in the formula below.

$$L_{tof} = \frac{c}{4\pi f} Td + \Delta L + Li \qquad \text{[Formula 6]}$$

Figure 3:
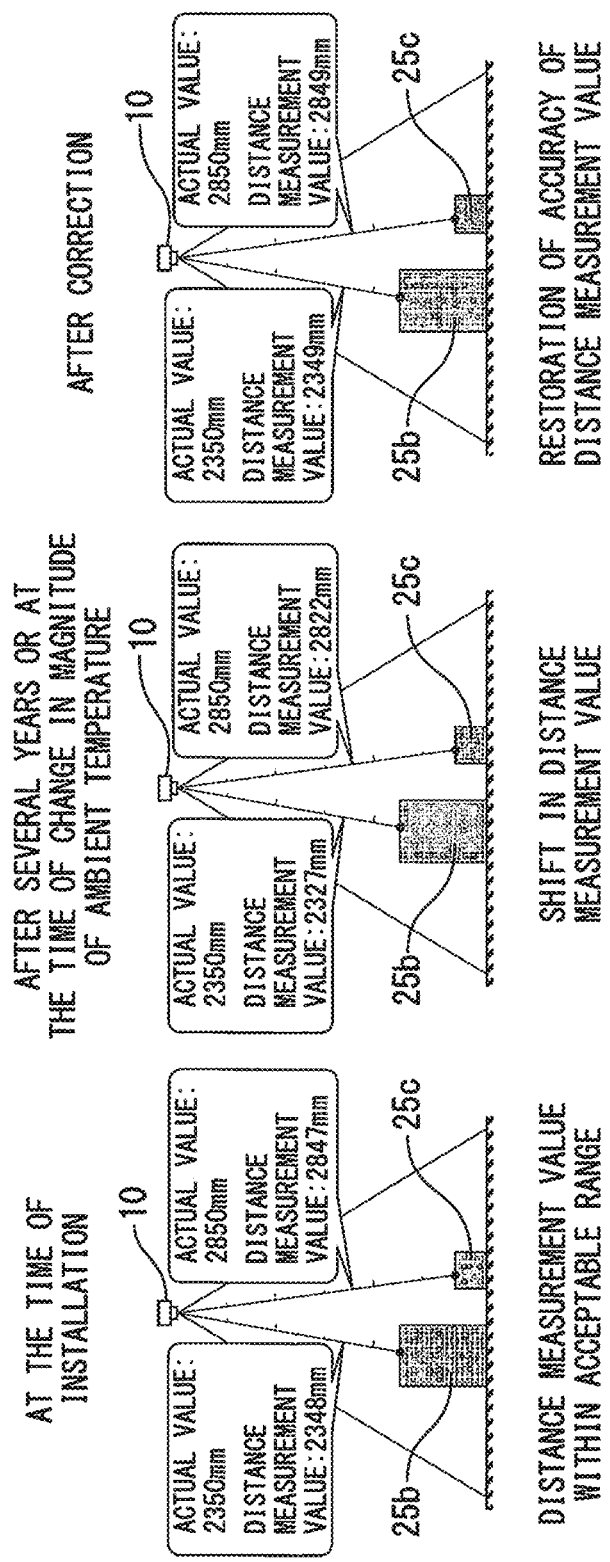
FIG. 3 is a view showing distance measurement values at the time of installation of the distance measurement apparatus according to one embodiment, after several years or when the ambient temperature changes significantly, and after correction.

FIG. 3 is a view showing the distance measurement values at the time of installation of the distance measuring apparatus 10, after several years or when the magnitude of the ambient temperature changes, and after correction. Though the distance measurement value is within an acceptable range at the time of installation of the distance measuring apparatus 10, after several years or when the magnitude of the ambient temperature changes, since the distance measurement value may deviate from the acceptable range, the operator corrects the distance measurement value using the distance correction function of the distance measuring apparatus 10. Alternatively, the distance measuring apparatus 10 may continuously monitor the reference object 25 and perform distance correction as necessary to maintain accuracy. According to such a distance measuring apparatus 10, distance measurement errors due to individual characteristic variation of the electronic elements or aging of the electronic elements can be easily corrected.

As a distance correction method of other embodiment of the present application, a method in which a plurality of distance values on a plane of the reference object other than the method in which the distances of the representative feature points are used described above will be described based on FIG. 4. In order to measure distance based on TOF, unlike a known stereo method, the distance measuring apparatus 10 can measure the distance of a plane of an object without changes in intensity. Thus, the reference distance calculation section 26 and the correction amount calculation section 27 may calculate the correction amount Li for correcting the distance image by determining the position and posture of a plane 33 from a plurality of feature points in a two-dimensional image in which the plane 33 is captured, and complexly comparing the distance value of each pixel in which the plane 33 is captured with the distance measurement value of each pixel in the distance image corresponding to these pixel. As a result, the distance measuring apparatus 10 can perform more accurate correction. Note that the position of the plane 33 means the distance values of the plurality of feature points, and the posture of the plane 33 means the inclination of the plane 33 relative to the optical axis of the distance measuring apparatus 10.

For example, for a reference marker 25*a* having, for example, four corners 32*l*, 32*m*, 32*n*, 32*o*, the reference object distance calculation section 26 detects the reference marker 25*a* and the plurality of feature points (for example, four corners, and central portion of the perfect circle, square, and rhombus) from the two-dimensional image, and determines the position and posture of the plane 33. Next, the reference object distance calculation section 26 calculates the distance measurement values of each of the pixels which specify the plane 33 from the position and posture of the plane 33, and outputs the positions of the specified pixels in the image and the distance measurement values of the pixels to the correction amount calculation section 27. The correction amount calculation section 27 may determine the difference between the average value of the distance values of the pixels and average value of the distance measurement values in the distance image corresponding to the positions of the specified pixels to calculate the correction amount Li.

In a distance image based on the TOF principle, in general, pixels having a high light intensity have a higher precision than pixels having a low light intensity. Thus, when averaging the distance measurement values in the distance image corresponding to the positions of the pixels in the image specified as described above, weighted averaging may be performed by weighting the light intensities of the pixels. As a result, a more accurate correction amount Li can be acquired. The light intensity I is calculated from, for example, the following known formula.

$$I = \frac{\sqrt{(Q_1 - Q_3)^2 + (Q_2 - Q_4)^2}}{2} \qquad \text{[Formula 7]}$$

According to the embodiment above, since the two-dimensional image 31 and the distance image 30 correspond on a pixel-by-pixel basis, the correction amount for correcting the distance image 30 can be calculated using the distance to the reference object 25, which was geometrically calculated from the two-dimensional image 31. Thus, correction of the distance measurement errors generated due to individual characteristic variations of the electronic elements or aging of the electronic elements can be easily realized.

Though various embodiments have been described in the present description, the present invention is not limited to the embodiments described above. Note that various modifications can be made within the scope described in the claims below.

The invention claimed is:

1. A distance measuring apparatus, comprising a light emitting section which emits reference light to a target measurement space at a predetermined light emission timing, and a plurality of light receiving elements which are two-dimensionally arranged and which receive incident light from the target measurement space at a predetermined image capture timing, wherein the distance measuring apparatus outputs a distance image to an object in the target measurement space based on light reception amounts of the light receiving elements, and a two-dimensional image corresponding to the distance image, the distance measuring apparatus further comprising:
    a reference object distance calculation section which calculates a distance to the reference object based on the two-dimensional image in which a reference object including a plurality of feature points having three-dimensional coordinate correlations is captured, and
    a correction amount calculation section which calculates a correction amount for correcting the distance image by comparing the calculated distance to the reference object with a distance measurement value to the reference object in the distance image.

2. The distance measuring apparatus according to claim 1, wherein the reference object is a reference marker comprising a plurality of feature points having known three-dimensional coordinate correlations.

3. The distance measuring apparatus according to claim 1, wherein the reference object is an arbitrary object, and the distance measuring apparatus further comprises a means for indicating feature values of the object or the positional relationship between a plurality of the objects as the three-dimensional coordinate correlations.

4. The distance measuring apparatus according to claim 1, further comprising an emission/image capture timing control section which controls the light emission timing or the image capture timing based on the correction amount.

5. The distance measuring apparatus according to claim 1, further comprising a distance image generation section which generates the distance image based on the correction amount.

* * * * *